United States Patent
Liang et al.

(10) Patent No.: US 10,803,552 B2
(45) Date of Patent: Oct. 13, 2020

(54) VIDEO RESOLUTION UP-CONVERSION METHOD AND DEVICE

(71) Applicant: GUANGZHOU UCWEB COMPUTER TECHNOLOGY CO., LTD., Guangzhou (CN)

(72) Inventors: Jie Liang, Guangzhou (CN); Xiaohui Bie, Guangzhou (CN)

(73) Assignee: Guangzhou UCWeb Computer Technology Co., Ltd., Guangzhou (CN)

( * ) Notice: Subject to any disclaimer, the term of this patent is extended or adjusted under 35 U.S.C. 154(b) by 181 days.

(21) Appl. No.: 15/995,521

(22) Filed: Jun. 1, 2018

(65) Prior Publication Data

US 2018/0276794 A1   Sep. 27, 2018

Related U.S. Application Data

(63) Continuation of application No. PCT/CN2016/107903, filed on Nov. 30, 2016.

(30) Foreign Application Priority Data

Dec. 3, 2015   (CN) .......................... 2015 1 0882457

(51) Int. Cl.
G06K 9/32 (2006.01)
G06K 9/46 (2006.01)
(Continued)

(52) U.S. Cl.
CPC .......... *G06T 3/4053* (2013.01); *G06T 3/4007* (2013.01); *G06T 7/262* (2017.01);
(Continued)

(58) Field of Classification Search
None
See application file for complete search history.

(56) References Cited

U.S. PATENT DOCUMENTS 7,085,436 B2   8/2006   Akhan et al.
7,676,103 B2   3/2010   Ali
(Continued)

FOREIGN PATENT DOCUMENTS

CN   101430759 A   5/2009
CN   101599169 A   12/2009
(Continued)

OTHER PUBLICATIONS

First Office Action, issued in related Chinese Application 201510882457.4, dated Mar. 1, 2019 (13 pages).
(Continued)

*Primary Examiner* — Randolph I Chu
(74) *Attorney, Agent, or Firm* — Sheppard Mullin Richter & Hampton LLP

(57) ABSTRACT

This application discloses a method and an apparatus for lifting video resolution, where an initial magnified signal obtained by performing upsampling on an original signal is decomposed into two parts, that is, a first signal and a second signal by means of forward wavelet transform, where the first signal and the original signal have the same volume, and high-frequency information in the original signal is preserved; then the first signal is enhanced, so that enhancement on the first signal is transferred to the second signal by performing inverse wavelet transform on the second signal and the enhanced first signal, to compensate high frequency loss in the second signal, that is, high-frequency information of an entire final magnified signal obtained through inverse wavelet transform is compensated relative to the initial magnified signal, so that a magnified image corresponding to the final magnified signal can better preserve high-frequency information of an original image, vagueness of the magnified image is reduced or even eliminated, and definition of an entire video is improved.

15 Claims, 3 Drawing Sheets

(51) Int. Cl.
*G06T 3/40* (2006.01)
*H04N 7/01* (2006.01)
*H04N 19/63* (2014.01)
*G06T 7/262* (2017.01)

(52) U.S. Cl.
CPC .......... *H04N 7/0135* (2013.01); *H04N 19/63* (2014.11); *G06T 2207/20028* (2013.01); *G06T 2207/20064* (2013.01)

(56) References Cited

U.S. PATENT DOCUMENTS

| | | |
|---|---|---|
| 8,284,314 B2 | 10/2012 | Wallace et al. |
| 8,659,618 B2 | 2/2014 | Huang et al. |
| 8,755,623 B2 | 6/2014 | Du |
| 8,805,114 B2 | 8/2014 | Zhai |
| 9,087,390 B2 | 7/2015 | Jin et al. |
| 9,305,332 B2 | 4/2016 | Tao et al. |
| 9,444,548 B1 | 9/2016 | Hamory et al. |
| 2005/0265629 A1 | 12/2005 | Fu et al. |
| 2006/0115176 A1 | 6/2006 | Kanamori et al. |
| 2006/0222079 A1* | 10/2006 | Park ................ H04N 21/21805 375/240.16 |
| 2006/0284891 A1 | 12/2006 | Kirenko et al. |
| 2007/0223887 A1* | 9/2007 | Kanamori ............ G06T 3/4053 386/232 |
| 2007/0229658 A1 | 10/2007 | Kanamori et al. |
| 2008/0002915 A1 | 1/2008 | Nam et al. |
| 2009/0135911 A1* | 5/2009 | Au ........................ H04N 19/52 375/240.16 |
| 2009/0297018 A1 | 12/2009 | Rad et al. |
| 2010/0182459 A1 | 7/2010 | Hwang et al. |
| 2011/0028813 A1 | 2/2011 | Watson et al. |
| 2011/0243378 A1 | 10/2011 | Lee |
| 2012/0179055 A1* | 7/2012 | Tamil ................ A61B 5/0452 600/509 |
| 2012/0183073 A1 | 7/2012 | Milstein |
| 2012/0301046 A1 | 11/2012 | Wallace |
| 2013/0028538 A1 | 1/2013 | Simske et al. |
| 2013/0207992 A1 | 8/2013 | Wasberger et al. |
| 2014/0064590 A1* | 3/2014 | Imamura .................. A61B 6/00 382/131 |
| 2014/0379278 A1* | 12/2014 | Tilden ...................... G01J 3/28 702/28 |
| 2016/0048947 A1 | 2/2016 | Lakshman et al. |
| 2016/0364840 A1 | 12/2016 | Zhang |

FOREIGN PATENT DOCUMENTS

| | | |
|---|---|---|
| CN | 101783872 A | 7/2010 |
| CN | 102063699 A | 5/2011 |
| CN | 103500436 A | 1/2014 |
| CN | 104036455 A | 9/2014 |
| CN | 104299185 A | 1/2015 |
| CN | 104851077 A | 8/2015 |
| WO | 2014/173970 A1 | 10/2014 |

OTHER PUBLICATIONS

First Search Report, issued in related Chinese Application 201510882457.4, dated Feb. 20, 2019 (2 pages).
International Preliminary Report on Patentability dated Jun. 6, 2018, issued in related International application No. PCT/CN2016/107903 (10 Pages).
International Search Report and Written Opinion for Application No. PCT/CN2016/107903, dated Mar. 7, 2017, 8 pages.
Second Office Action dated Oct. 18, 2019, issued in related Chinese Patent Application No. 201510882457.4, with English machine translation (15 pages).

* cited by examiner

VIDEO RESOLUTION UP-CONVERSION METHOD AND DEVICE

CROSS-REFERENCE TO RELATED APPLICATION

This application is a continuation application of International Patent Application No. PCT/CN2016/107903, filed on Nov. 30, 2016, which is based on and claims priority to Chinese Patent Application Serial No. 201510882457.4 filed on Dec. 3, 2015. All contents of the above-referenced applications are hereby incorporated by reference in their entity.

TECHNICAL FIELD

The present invention relates to the field of video processing technologies, and in particular, to a method and an apparatus for lifting video resolution.

RELATED ART

Network videos have become an industry that develops very fast in recent years and play an increasingly important role in people's life. With the development of a related information technology and continuous upgrade of various terminal devices, a user has an increasingly high requirement on resolution of a network video. Although high video resolution provides better definition, correspondingly, a higher bandwidth is needed for network transmission. Consequently, overheads of a network video operator and a terminal user are increased.

To satisfy demands of the user for a high-definition network video and reduce transmission overheads of the network video, a related technology usually uses a resolution lifting technology (a super-resolution technology) to lift resolution of the network video during video playback. That is, while the video is played, the downloaded or buffered network video is magnified in real time from a low-resolution video to a high-resolution video. Currently, a commonly used video resolution lifting method includes a bilinear-interpolation-based processing method, a bicubic-interpolation-based processing method, and the like. Resolution of each frame of image in a network video downloaded by a player is lifted in real time by building a corresponding processing module in the network video player.

The foregoing interpolation-based resolution lifting technology has a fast processing speed, which enables real-time processing in a video playback process. However, whether in the bilinear-interpolation-based processing method or in the bicubic-interpolation-based processing method, an interpolation signal thereof lacks information corresponding to a high-frequency part of an original signal, that is, the interpolation signal lacks high-frequency information. Consequently, a processed video image misses edges and details, and as a result, the image becomes vague, and definition of the video is seriously affected.

SUMMARY

To resolve the foregoing technical problem, this application discloses a method and an apparatus for lifting video resolution.

According to a first aspect, this application provides a method for lifting video resolution, including:

performing an interpolation-based upsampling operation on an original signal of each frame of image in a target video, to obtain an initial magnified signal of a corresponding magnified image;

performing forward wavelet transform on the initial magnified signal, so that the initial magnified signal is decomposed into a first signal and a second signal, where the first signal and the original signal have the same volume;

enhancing the first signal; and performing inverse wavelet transform on the second signal and the enhanced first signal, to obtain a final magnified signal of the magnified image.

With reference to the first aspect, in a first feasible implementation of the first aspect, the performing forward wavelet transform on the initial magnified signal, so that the initial magnified signal is decomposed into a first signal and a second signal includes:

segmenting the initial magnified signal s[n] into a first segmentation signal $s_e[n/2]$ and a second segmentation signal $s_o[n/2]$ that are associated with each other;

performing a prediction operation according to a formula $d[n/2]=s_o[n/2]-P(s_e[n/2])$, to obtain the first signal $d[n/2]$, where $P(\bullet)$ is a preset prediction operator; and performing an update operation according to formula $c[n/2]\ s_e[n/2]+U(d[n/2])$, to obtain the second signal $c[n/2]$, where $U(\bullet)$ is a preset update operator.

With reference to the first feasible implementation of the first aspect, in a second feasible implementation of the first aspect, the performing inverse wavelet transform on the second signal and the enhanced first signal, to obtain a final magnified signal of the magnified image includes:

performing an inverse update operation according to the update operator, the second signal, and the enhanced first signal, to obtain the enhanced first segmentation signal;

performing an inverse prediction operation according to the prediction operator, the enhanced first signal, and the enhanced first segmentation signal, to obtain the enhanced second segmentation signal; and merging the enhanced first segmentation signal and the enhanced second segmentation signal, to obtain the final magnified signal of the magnified image.

With reference to the first aspect, or the first feasible implementation of the first aspect, or the second feasible implementation of the first aspect, in a third feasible implementation of the first aspect, the performing an interpolation-based upsampling operation on an original signal of each frame of image in a target video includes:

performing a bilinear-interpolation-based upsampling operation or a bicubic-interpolation-based upsampling operation on the original signal of each frame of image in the target video.

With reference to the first aspect, or the first feasible implementation of the first aspect, or the second feasible implementation of the first aspect, in a fourth feasible implementation of the first aspect, the method further includes:

determining the number n of times of wavelet transform according to a preset magnified N of the target video, where $N=n/(n-1)$, and n is an integer not less than 2;

the performing forward wavelet transform on the initial magnified signal includes: performing forward wavelet transform n times on the initial magnified signal; and the performing inverse wavelet transform on the second signal and the enhanced first signal includes: performing inverse wavelet transform n times on the second signal and the enhanced first signal.

According to a second aspect, this application provides an apparatus for lifting video resolution, including:

an upsampling unit, configured to perform an interpolation-based upsampling operation on an original signal of each frame of image in a target video, to obtain an initial magnified signal of a corresponding magnified image;

a forward transform unit, configured to perform forward wavelet transform on the initial magnified signal, so that the initial magnified signal is decomposed into a first signal and a second signal, where the first signal and the original signal have the same volume;

an enhancement unit, configured to enhance the first signal; and an inverse transform unit, configured to perform inverse wavelet transform on the second signal and the enhanced first signal, to obtain a final magnified signal of the magnified image.

With reference to the second aspect, in a first feasible implementation of the second aspect, the forward transform unit includes:

a segmentation unit, configured to segment the initial magnified signal s[n] into a first segmentation signal $s_e[n/2]$ and a second segmentation signal $s_o[n/2]$ that are associated with each other;

a prediction unit, configured to perform a prediction operation according to a formula $d[n/2]=s_o[n/2]-P(s_e[n/2])$, to obtain the first signal d[n/2], where P(•) is a preset prediction operator; and an update unit, configured to perform an update operation according to a formula $c[n/2]=s_e[n/2]+U(d[n/2])$, to obtain the second signal c[n/2], where U(•) is a preset update operator.

With reference to the first feasible implementation of the second aspect, in a second feasible implementation of the second aspect, the inverse transform unit includes:

an inverse update unit, configured to perform an inverse update operation according to the update operator, the second signal, and the enhanced first signal; to obtain the enhanced first segmentation signal;

an inverse prediction unit, configured to perform an inverse prediction operation according to the prediction operator, the enhanced first signal, and the enhanced first segmentation signal, to obtain the enhanced second segmentation signal; and a merging unit, configured to merge the enhanced first segmentation signal and the enhanced second segmentation signal, to obtain the final magnified signal of the magnified image.

With reference to the second aspect, or the first feasible implementation of the second aspect; or the second feasible implementation of the second aspect, in a third feasible implementation of the second aspect, the upsampling unit includes at least one of:

a first upsampling unit, configured to perform a bilinear-interpolation-based upsampling operation on the original signal of each frame of image in the target video; and a second upsampling unit; configured to perform a bicubic-interpolation-based upsampling operation on the original signal of each frame of image in the target video.

With reference to the second aspect, or the first feasible implementation of the second aspect, or the second feasible implementation of the second aspect, in a fourth feasible implementation of the second aspect, the apparatus further includes:

a number-of-times-of-transform determining unit, configured to determine the number n of times of wavelet transform according to a preset magnified N of the target video, where N=n/(n−1), and n is an integer not less than 2;

correspondingly, the forward transform unit is specifically configured to perform forward wavelet transform n times on the initial magnified signal; and the inverse transform unit is specifically configured to perform inverse wavelet transform n times on the second signal and the enhanced first signal.

According to a third aspect, this application provides a computing device, including: a network interface, enabling the computing device to obtain a target video; and a processor connected to the network interface, where the processor is configured to perform the following operations: performing an interpolation-based upsampling operation on an original signal of each frame of image in a target video, to obtain an initial magnified signal of a corresponding magnified image; performing forward wavelet transform on the initial magnified signal, so that the initial magnified signal is decomposed into a first signal and a second signal, where the first signal and the original signal have the same volume; enhancing the first signal; and performing inverse wavelet transform on the second signal and the enhanced first signal, to obtain a final magnified signal of the magnified image.

According to a fourth aspect, this application further provides a non-transient machine readable storage medium, storing executable code, when the executable code is executed by a processor, causing the processor to perform the method according to the first aspect of this application.

The present disclosure further provides an apparatus for lifting video resolution, comprising a processor and a non-transitory computer-readable storage medium storing instructions that, when executed by the processor, cause the apparatus to perform an interpolation-based upsampling operation on an original signal of each frame of an image in a target video, to obtain an initial magnified signal of a magnified image corresponding to the image in the target video, perform a forward wavelet transform on the initial magnified signal to decompose the initial magnified signal into a first signal and a second signal, wherein the first signal and the original signal have the same volume, enhance the first signal, and perform an inverse wavelet transform on the second signal and the enhanced first signal, to obtain a final magnified signal of the magnified image.

The present disclosure further provides a computing device, comprising a network interface, enabling the computing device to obtain a target video, a processor connected to the network interface, and a non-transitory computer-readable storage medium storing instructions that, when executed by the processor, cause the apparatus to perform a method, which comprises performing an interpolation-based upsampling operation on an original signal of each frame of an image in a target video, to obtain an initial magnified signal of a magnified image corresponding to the image, performing a forward wavelet transform on the initial magnified signal to decompose the initial magnified signal into a first signal and a second signal, wherein the first signal and the original signal have the same volume; enhancing the first signal, and performing inverse wavelet transform on the second signal and the enhanced first signal, to obtain a final magnified signal of the magnified image.

It can be known from the foregoing technical solutions that in the embodiments of this application; an initial magnified signal obtained by performing upsampling on an original signal is decomposed into two parts, that is, a first signal and a second signal by means of forward wavelet transform, where the first signal and the original signal have the same volume, and high-frequency information in the original signal is preserved; then the first signal is enhanced, so that enhancement on the first signal is transferred to the second signal by performing inverse wavelet transform on the second signal and the enhanced first signal, to compensate high frequency loss in the second signal, that is, high-frequency information of an entire final magnified signal obtained through inverse wavelet transform is compensated relative to the initial magnified signal, so that a magnified image corresponding to the final magnified signal can better preserve high-frequency information of an original image, vagueness of the magnified image is reduced or even eliminated, and definition of an entire video is improved.

BRIEF DESCRIPTION OF THE DRAWINGS

To describe the technical solutions in the embodiments of the present invention or the prior art more clearly, the following briefly introduces the accompanying drawings required for describing the embodiments or the prior art. Apparently, a person of ordinary skill in the art may still derive other drawings from these accompanying drawings without creative efforts.

DETAILED DESCRIPTION

Exemplary embodiments are described in detail herein, and examples thereof are indicated in the accompanying drawings. When the following descriptions involve the accompanying drawings, unless otherwise indicated, same numbers in different accompanying drawings indicate the same or similar elements. Implementations described in the following exemplary embodiments do not indicate all implementations consistent with the present invention. On the contrary, the implementations are merely examples of apparatuses and methods consistent with some aspects of the present invention as described in detail in the appended claims.

Figure 1:
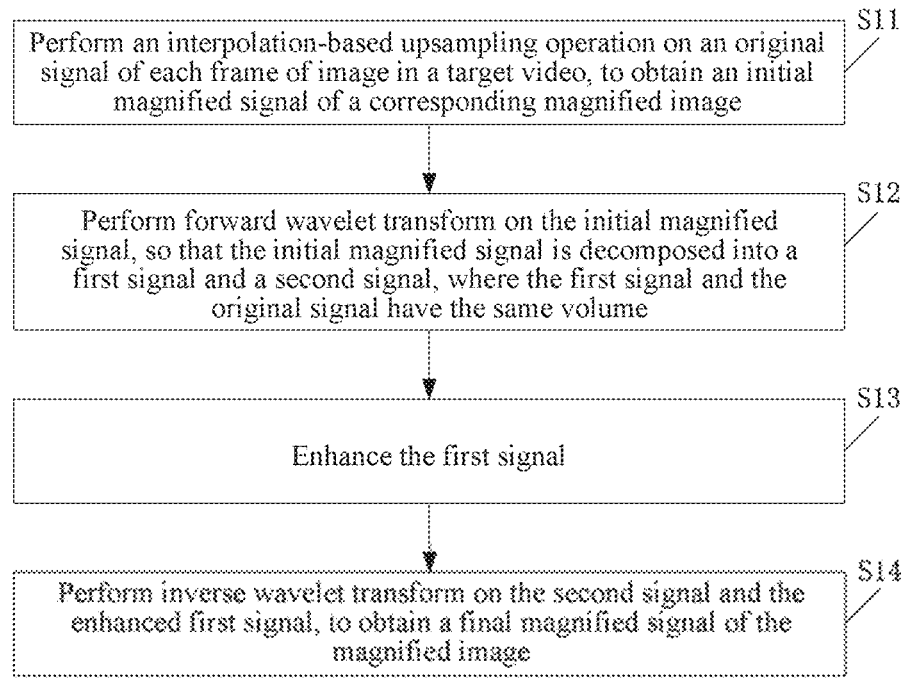
FIG. 1 is a flowchart of a method for lifting video resolution according to an embodiment of this application.

An embodiment of a method for lifting video resolution provided in this application is described first. FIG. 1 is a flowchart of a method for lifting video resolution according to an embodiment of this application. The method for lifting video resolution uses a frame as a unit to process in real time a target video downloaded by a network video player, that is, steps in this embodiment of this application are separately performed on each frame of image of the target video, to obtain a magnified image of each frame of image. Referring to FIG. 1, the method for lifting video resolution includes the following steps:

Step S11: Perform an interpolation-based upsampling operation on an original signal of each frame of image in a target video, to obtain an initial magnified signal of a corresponding magnified image.

Figure 2:
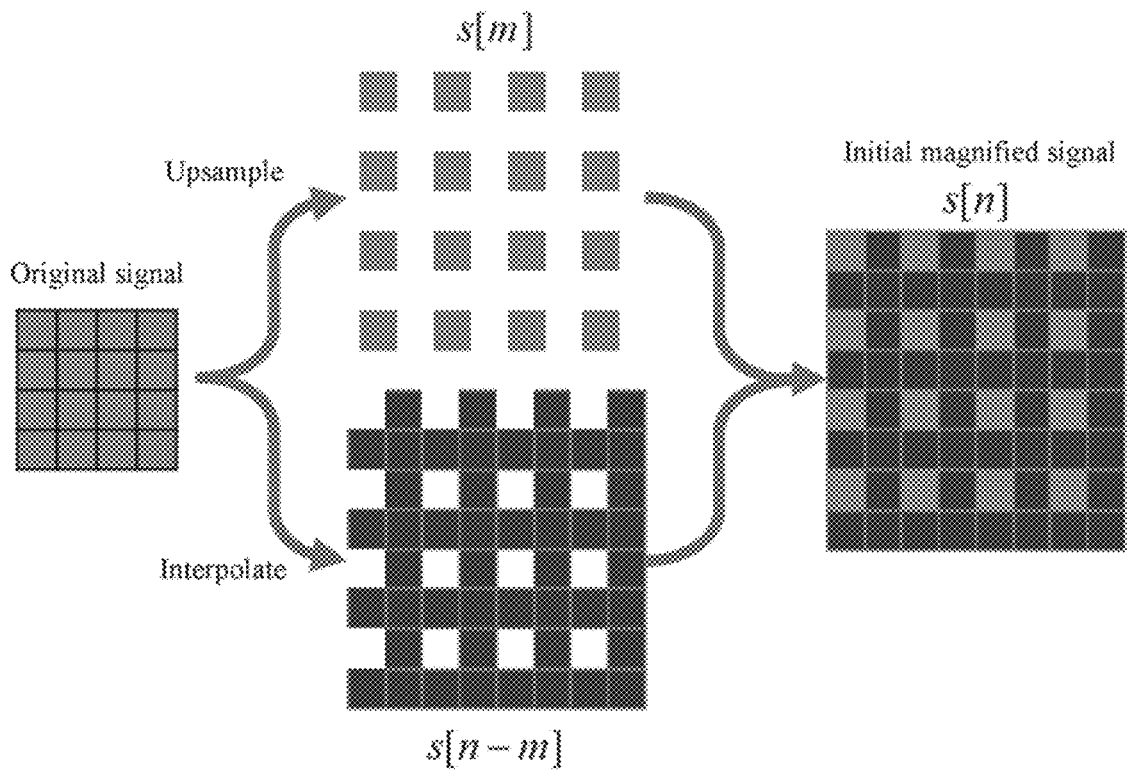
FIG. 2 is a principle schematic diagram of performing upsampling on a video signal.

As shown in FIG. 2, the interpolation-based upsampling operation is performed on an original signal of any frame of image, to obtain a corresponding initial magnified signal s[n]. The initial magnified signal s[n] includes two parts: a first part is s[m](n>m), is directly obtained by upsampling the original signal, and has the same volume as the original signal; a second part is s[n−m] and is obtained by interpolating neighboring pixels in the original signal.

For example, a semaphore interpolation formula of a pixel p($S_p$531 s[n−m]) is $$s_p = \sum_{q \in C_p} w_{pq} s_q,$$

where $C_p = \{q | q \in N_p \& s_q \in s[m]\}$, $$\sum_{q \in C_p} w_{pq} = 1,$$

and $N_p$ represents a neighboring domain of the pixel p. It is set that a maximum and a minimum of semaphores in $C_p$ (an upper boundary and a lower boundary of semaphores in a neighboring domain $N_p$) are respectively marked as $s^M$ and $s^m$. Therefore, it can be known from the foregoing interpolation formula that $s^m < s_p < s^M$. That is, $s_p$ cannot obtain the upper boundary and lower boundary of semaphores in the neighboring domain $N_p$, and the upper boundary and lower boundary herein are probably high-frequency edges and details within a local neighboring domain. Consequently, high-frequency information, for example, in the original signal cannot be reconstructed in s[n−m].

Therefore, an image corresponding to the foregoing initial magnified signal may be vague. This is a result that may be obtained by lifting video resolution by using an interpolation-based upsampling operation in a related technology. An objective of this embodiment is to make a pixel semaphore $s_p$ obtained through interpolation obtain a maximum and a minimum thereof, that is, make $s^m \leq s_p \leq s^M$, so that high-frequency information corresponding to the edges and details can be preserved, and image vagueness caused due to lack of the edges and details is eliminated.

Step S12: Perform forward wavelet transform on the initial magnified signal, so that the initial magnified signal is decomposed into a first signal and a second signal, where the first signal and the original signal have the same volume.

Step S13: Enhance the first signal.

Step S14: Perform inverse wavelet transform on the second signal and the enhanced first signal, to obtain a final magnified signal of the magnified image.

It can be known from the foregoing steps that in this embodiment of this application, an initial magnified signal is decomposed into two parts, that is, a first signal and a second signal by means of forward wavelet transform, where the first signal and the original signal have the same volume, and high-frequency information in the original signal is preserved; then the first signal is enhanced, so that enhancement on the first signal is transferred to the second signal by performing inverse wavelet transform on the second signal and the enhanced first signal, to compensate high frequency loss in the second signal, that is, high-frequency loss of an entire final magnified signal is compensated, so that a magnified image corresponding to the final magnified signal can better preserve high-frequency information of an original image, vagueness of the magnified image is reduced and even eliminated, and definition of an entire video is improved.

Specifically, the performing an interpolation-based upsampling operation on an original signal of each frame of image in a target video in step S11 may specifically use a bilinear-interpolation-based upsampling operation or a bicubic-interpolation-based upsampling operation.

In a feasible embodiment of this application, a wavelet constructing method based on a lifting scheme is preferably used to perform forward wavelet transform (step S12) and inverse wavelet transform (step S14) on a relevant signal.

Specifically, the performing forward wavelet transform on the initial magnified signal, to obtain a corresponding first signal and second signal in step S12 includes the following steps:

Step S121: Segment the initial magnified signal s[n] into a first segmentation signal $s_e[n/2]$ and a second segmentation signal $s_o[n/2]$ that are associated with each other.

Better correlation between the first segmentation signal $s_e[n/2]$ and the second segmentation signal $s_o[n/2]$ indicates a better segmentation effect. Specifically, a lazy segmentation method may be used, that is, segmentation may be performed according to parity of serial numbers of pixels: assuming that coordinates of any pixel are (x, y), the initial magnified signal may be segmented into the following two parts: x+y, which is a signal corresponding to odd pixels, and x+y, which is a signal corresponding to even pixels.

Step S122: Perform a prediction operation according to a formula $d[n/2]=s_o[n/2]-P(s_e[n/2])$, to obtain the first signal d[n/2], where P(•) is a preset prediction operator.

Step S123: Perform an update operation according to a formula $c[n/2] s_e[n/2]+U(d[n/2])$, to obtain the second signal c[n/2], where U(•) is a preset update operator.

For one-time forward wavelet transform, the first signal having the same volume as the original signal is actually a high-frequency signal in the original magnified signal, and the second signal is actually a subsampling signal other than the high-frequency signal.

Figure 3:
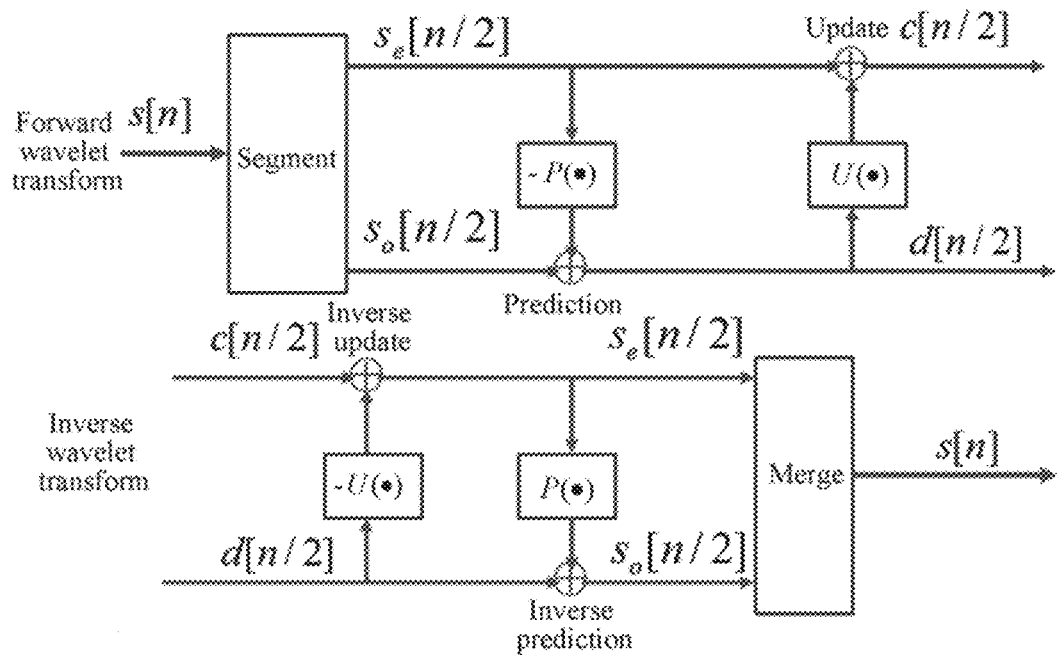
FIG. 3 is a principle schematic diagram of performing wavelet transform on a relevant signal according to an embodiment of this application.

In the principle schematic diagram of wavelet transform shown in FIG. 3, in the prediction operation in a forward wavelet transform process, $s_e[n/2]$ is used to predict $s_o[n/2]$, and d[n/2] is a prediction error. The prediction operation is invertible. As long as the prediction operator P(•) is determined, $s_o[n/2]$ can be recovered from d[n/2] and $s_e[n/2]$, and further, the initial magnified signal s[n] is recovered.

Correspondingly, in the update operation in the forward wavelet transform process, $s_e[n/2]$ is amended by using the prediction error d[n/2], so that the amended signal c[n/2] includes only a low-frequency part in the initial magnified signal s[n]. The update operation is also invertible. As long as the update operator U(•) is determined, $s_e[n/2]$ can be recovered from c[n/2] and d[n/2].

In a feasible embodiment of this application, for any pixel p, the prediction operator P(•) used to perform step S122 may be $$P(s(p)) = \frac{\sum_{q \in N_p} w(p,q)s(q)}{\sum_{q \in N_p} w(p,q)};$$

the update operator U(•) used to perform step S123 may be:

$$U(s(p)) = \frac{\sum_{q \in N_p} w(p,q)s(q)}{2\sum_{q \in N_p} w(p,q)}.$$

$N_p$ represents a neighboring domain of the pixel P, and w(p,q) is a weight between pixels p and q. To better preserve image edges, a weight function that can ensure edges to be kept needs to be selected. The following weight calculation formula: $w(p,q)=e^{-\|I_p-I_q\|/\sigma_c 2}$ is used in this embodiment. $I_p$ and $I_q$ are respectively brightness values of the pixels p and q, and $\sigma_c$ is a constant (the constant may be determined by using an image brightness variance).

In this embodiment, both of the prediction operation in step S122 and the update operation in step S123 are weighted calculations on each pixel and surrounding pixels thereof (that is, a neighboring domain) in a magnified image corresponding to the initial magnified signal. For example, for any pixel p whose coordinates are (x,y), a neighboring domain $N_p$ thereof may simply include an upper, a lower, a left, and a right neighboring pixel of the pixel p, that is, $N_p=\{(x,y-1),(x-1,y),(x+1,y),(x,y+1)\}$. Therefore, the prediction operation and the update operation on the pixel p are weighted calculations on the pixel p according to the foregoing formula by using four neighboring pixels thereof.

Correspondingly, the performing inverse wavelet transform on the second signal and the enhanced first signal, to obtain a final magnified signal of the magnified image in step S14 includes the following steps:

Step S141: Perform an inverse update operation according to the update operator, the second signal, and the enhanced first signal, to obtain the enhanced first segmentation signal.

Step S142: Perform an inverse prediction operation according to the prediction operator, the enhanced first signal, and the enhanced first segmentation signal, to obtain the enhanced second segmentation signal.

Step S143: Merge the enhanced first segmentation signal and the enhanced second segmentation signal, to obtain the final magnified signal of the magnified image.

The prediction operation and the update operation in this embodiment are both invertible operations. That is, step S141 is equivalent to an inverse operation of step S123, and step S142 is equivalent to an inverse operation of step S122. Assuming that the first signal d[n/2] obtained in step S122 is enhanced in step S13, to obtain the enhanced first signal d̃[n/2], an inverse update operation formula used in step S141 can be deduced according to the update operation formula $c[n/2]=s_e[n/2]+U(d[n/2])$ in step S123, to obtain the enhanced first segmentation signal $\tilde{s}_e[n/2]$, that is, $\tilde{s}_e[n/2]=c[n/2]-U(\tilde{d}[n/2])$. Further, an inverse prediction operation formula used in step S142 can be deduced according to the inverse prediction operation formula in step S122, to obtain the enhanced second segmentation signal $\tilde{s}_o[n/2]$, that is, $\tilde{s}_o[n/2]=\tilde{d}[n/2]+P(\tilde{s}_e[n/2])$. Finally, $\tilde{s}_e[n/2]$ and $\tilde{s}_o[n/2]$ are merged in step S143, that is, the final magnified signal $\tilde{s}[n]$ is obtained.

It can be known from the foregoing steps that in this embodiment of this application, an original signal of each frame of image in a target video is sampled by using an interpolation-based upsampling operation, to obtain a corresponding magnified signal s[n]. Then, forward wavelet transform based on a lifting scheme (including three steps: a segmentation operation, a prediction operation, and an update operation) is executed on s[n], so that s[n] is decomposed into two parts, that is, a first signal d[n/2] and a second signal c[n/2]. Then, the first signal d[n/2] is enhanced, to obtain the enhanced first signal $\tilde{d}[n/2]$. At last, inverse wavelet transform (including three steps: the inverse update operation, the inverse prediction operation, and the merging operation) is performed on the enhanced first signal $\tilde{d}[n/2]$ and the second signal c[n/2], and enhancement on the first signal d[n/2] is expanded to the second signal c[n/2], so that the second signal in the final magnified signal $\tilde{s}[n]$ is also enhanced relative to s[n], that is, whole $\tilde{s}[n]$ is enhanced relative to s[n], so that while resolution is lifted, a final magnified image corresponding to $\tilde{s}[n]$ can also preserve high-frequency information of edges, details, and the like, and vagueness can be reduced or even eliminated. In addition, because calculation complexity of wavelet transform based on a lifting scheme is relatively low, relative to a related technology, a calculation amount increased in this embodiment of this application is very small, and a processing speed can reach or even exceed a playback speed of the target video.

In this embodiment of this application, the preset magnified N of the target video resolution is different, the number n of times of wavelet transform that needs to be executed is also different. A relationship between the preset magnified N and the number n of times of wavelet transform is: N=n/(n−1), where n is an integer not less than 2. That is, when N=2, n=2; when N=3/2, n=3; when N=4/3, n=4. The rest can be deduced by analogy.

Figure 4:
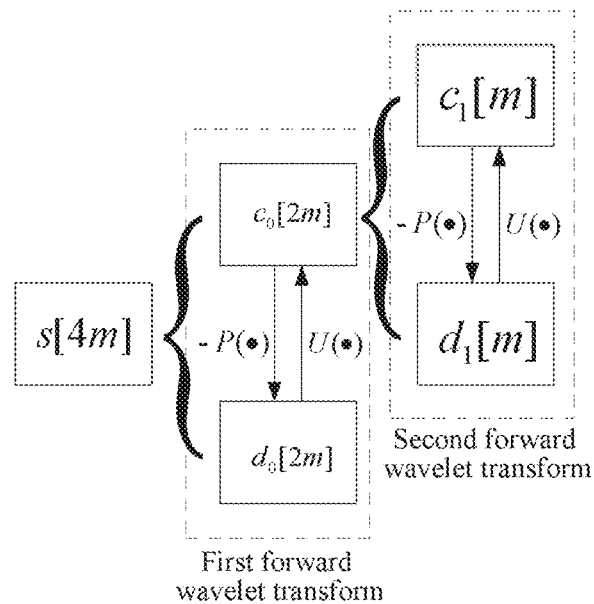
FIG. 4 is a principle schematic diagram of performing wavelet transform twice on a relevant signal according to an embodiment of this application.

Using an example in which the resolution of the target video is magnified twice, in step S11, the original signal s[m] is changed to the initial magnified signal s[4m], and in step S12, forward wavelet transform is executed twice: as shown in FIG. 4, first, first forward wavelet transform is executed on s[4m], so that s[4m] is decomposed into a high-frequency signal $d_0[2m]$ and a subsampling signal $c_0[2m]$; then second forward wavelet transform is executed on the subsampling signal $c_0[2m]$, to obtain the high-frequency signal $d_1[m]$ and the subsampling signal $c_1[m]$. The subsampling signal $c_1[m]$ is a signal having the same volume as the original signal s[m] and enhances $c_1[m]$ in step S13 as the first signal, to obtain the enhanced subsampling signal $\tilde{c}_1[m]$.

Further, inverse wavelet transform is executed twice in step S14: first, first inverse wavelet transform is performed on $d_1[m]$ and the enhanced subsampling signal $\tilde{c}_1[m]$, so that enhancement on $c_1[m]$ is expanded to $d_1[m]$, to obtain the enhanced subsampling signal $\tilde{c}_0[2m]$; then, second inverse wavelet transform is performed on $d_0[2m]$ and the enhanced subsampling signal $\tilde{c}_0[2m]$, so that enhancement on $c_0[2m]$ is expanded to $d_0[2m]$, to obtain the enhanced initial magnified signal, that is, the final magnified signal $\tilde{s}[4m]$.

The forward wavelet transform and inverse wavelet transform processes when the preset magnification is another possible value may be obtained according to the foregoing situation in which N=2 and are not described in detail herein.

It is known through actual verification that when resolution of a target video whose resolution is 600*400 is lifted, it takes approximately 22 ms to process one frame of image (CUP: I5 520 M, RAM: 4 GB) by using the method in this embodiment, which is basically synchronous with video playback. In addition, the step in this embodiment may be optimized by using either of the following two manners in other embodiments of this application, to improve a processing speed:

1) Optimization is performed by using an sse or neon instruction; the optimization manner can improve the processing speed by more than three times.

2) The step in this embodiment is performed by using a graphics processing unit (GPU) to assist a CPU; because parallel granularity of the GPU is higher, the processing speed can be improved by ten times in theory by using any GPU parallel calculation architecture such as GLSL, OpenCL, or CUDA.

Figure 5:
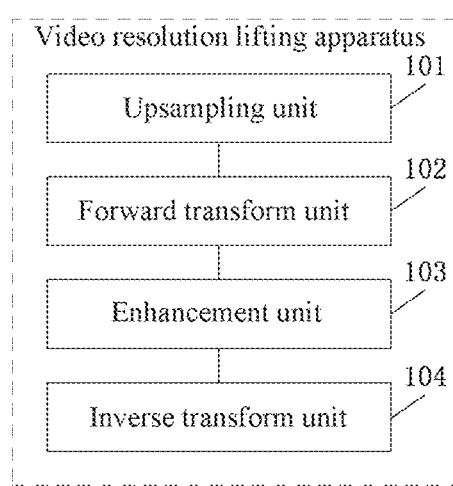
FIG. 5 is a structural block diagram of an apparatus for lifting video resolution according to an embodiment of this application.

Corresponding to the foregoing embodiments of the network request processing method, an embodiment of this application further provide an apparatus for lifting video resolution. The apparatus is applied to a core of a player, to lift in real time resolution of a video played by the player. FIG. 5 is a schematic structural diagram of the apparatus. Referring to FIG. 5, the apparatus includes: an upsampling unit 101, a forward transform unit 102, an enhancement unit 103, and an inverse transform unit 104.

The upsampling unit 101 is configured to perform an interpolation-based upsampling operation on an original signal of each frame of image in a target video, to obtain an initial magnified signal of a corresponding magnified image.

The forward transform unit 102 is configured to perform forward wavelet transform on the initial magnified signal, so that the initial magnified signal is decomposed into a first signal and a second signal, where the first signal and the original signal have the same volume.

The enhancement unit 103 is configured to enhance the first signal.

The inverse transform unit 104 is configured to perform inverse wavelet transform on the second signal and the enhanced first signal, to obtain a final magnified signal of the magnified image.

It can be known from the foregoing technical solutions that in this embodiment of this application, an initial magnified signal obtained through upsampling is decomposed into two parts, that is, a first signal and a second signal by means of forward wavelet transform, where the first signal and the original signal have the same volume, and high-frequency information in the original signal is preserved, then the first signal is enhanced, so that enhancement on the first signal is transferred to the second signal by performing inverse wavelet transform on the second signal and the enhanced first signal, to compensate high frequency loss in the second signal, that is, high-frequency loss of an entire final magnified signal is compensated, so that a magnified image corresponding to the final magnified signal can better preserve high-frequency information of an original image, vagueness of the magnified image is reduced or even eliminated, and definition of an entire video is improved.

In a feasible implementation of this application, the forward transform unit 103 may specifically include a segmentation unit, a prediction unit, and an update unit.

The segmentation unit is configured to segment the initial magnified signal s[n] into a first segmentation signal $s_e[n/2]$ and a second segmentation signal $s_o[n/2]$ that are associated with each other.

The prediction unit is configured to perform a prediction operation according to a formula $d[n/2]=s_o[n/2]-P(s_e[n/2])$, to obtain the first signal d[n/2], where P(•) is a preset prediction operator.

The update unit is configured to perform an update operation according to a formula $c[n/2]=s_e[n/2]+U(d[n/2])$, to obtain the second signal $c[n/2]$, where $U(\bullet)$ is a preset update operator.

Correspondingly, the inverse transform unit 104 may specifically include an inverse update unit, an inverse prediction unit, and a merging unit.

The inverse update unit is configured to perform an inverse update operation according to the update operator, the second signal, and the enhanced first signal, to obtain the enhanced first segmentation signal.

The inverse prediction unit is configured to perform an inverse prediction operation according to the prediction operator, the enhanced first signal, and the enhanced first segmentation signal, to obtain the enhanced second segmentation signal.

The merging unit is configured to merge the enhanced first segmentation signal and the enhanced second segmentation signal, to obtain the final magnified signal of the magnified image.

It can be known from the foregoing structure that in this embodiment, resolution is lifted through wavelet transform based on a lifting scheme, and calculation complexity is low. Therefore, relative to a related technology, in this embodiment of this application, the calculation amount increased is very small. While the resolution is lifted, high-frequency information such as edges and details can be preserved, vagueness can be reduced or even eliminated, and it can be ensured that a processing speed reaches or even exceeds a playback speed of a target video.

In another feasible implementation of this application, the upsampling unit 101 may include at least one of:

a first upsampling unit, configured to perform a bilinear-interpolation-based upsampling operation on the original signal of each frame of image in the target video: and a second upsampling unit, configured to perform a bicubic-interpolation-based upsampling operation on the original signal of each frame of image in the target video.

In another feasible implementation of this application, the apparatus for lifting video resolution may further include: a number-of-times-of-transform determining unit, configured to determine the number n of times of wavelet transform according to a preset magnified N of the target video, where $N=n/(n-1)$, and n is an integer not less than 2.

Correspondingly, the forward transform unit 102 is configured to perform forward wavelet transform n times on the initial magnified signal; and the inverse transform unit 104 is configured to perform inverse wavelet transform n times on the second signal and the enhanced first signal.

The solutions of this application may also be implemented as a computing device. The computing device may include: a network interface, enabling the computing device to obtain a target video; and a processor connected to the network interface. The processor is configured to perform any method for lifting video resolution disclosed in the foregoing method embodiment.

In addition, an embodiment of this application further provides a non-transient machine readable storage medium, which may be, for example, a ROM, a random access memory (RAM), a CD-ROM, a magnetic disk, a floppy disk, and an optical data storage device. The readable storage medium stores executable code, for example, a program. When the program in the storage medium is executed by a processor of a video playback apparatus, the executable code causes the video playback apparatus to perform some or all of steps of any method for lifting video resolution disclosed in the foregoing method embodiment.

Embodiments in the specification are all described in a progressive manner. The same or similar parts of various embodiments may be mutually referred to. Each embodiment highlights differences between the embodiment and other embodiments. In particular, for the apparatus and system embodiments, because they are basically similar to the method embodiment, they are relatively simply description, and descriptions of the method embodiment may be referred to for related parts.

The foregoing descriptions are implementations of the present invention, but are not intended to limit the protection scope of the present invention. Any modification, equivalent replacement, and improvement made within the spirit and principle of the present invention should be all included in the protection scope of the present invention.

What is claimed is:

1. A method for lifting video resolution, comprising:
    performing an interpolation-based upsampling operation on an original signal of each frame of an image in a target video, to obtain an initial magnified signal of a magnified image corresponding to the image in the target video;
    obtaining a preset magnification N of the target video;
    determining a number n of times of wavelet transform according to the preset magnification N of the target video, wherein $N=n/(n-1)$, and n is an integer not less than 2;
    performing forward wavelet transform n times on the initial magnified signal to decompose the initial magnified signal into a first signal and a second signal, wherein the first signal and the original signal have the same volume;
    enhancing the first signal; and
    performing inverse wavelet transform n times on the second signal and the enhanced first signal, to obtain a final magnified signal of the magnified image.

2. The method according to claim 1, wherein the performing forward wavelet transform on the initial magnified signal to decompose the initial magnified signal into a first signal and a second signal comprises:
    segmenting the initial magnified signal s[n] into a first segmentation signal $s_e[n/2]$ and a second segmentation signal $s_o[n/2]$ that are associated with each other;
    performing a prediction operation according to a formula $d[n/2]=s_o[n/2]-P(s_e[n/2])$, to obtain the first signal $d[n/2]$, wherein $P(\bullet)$ is a preset prediction operator; and
    performing an update operation according to a formula $c[n/2]=s_e[n/2]+U(d[n/2])$, to obtain the second signal $c[n/2]$, wherein $U(\bullet)$ is a preset update operator.

3. The method according to claim 2, wherein the performing inverse wavelet transform on the second signal and the enhanced first signal, to obtain a final magnified signal of the magnified image comprises:
    performing an inverse update operation according to the update operator, the second signal, and the enhanced first signal, to obtain the enhanced first segmentation signal;
    performing an inverse prediction operation according to the prediction operator, the enhanced first signal, and the enhanced first segmentation signal, to obtain the enhanced second segmentation signal; and
    merging the enhanced first segmentation signal and the enhanced second segmentation signal, to obtain the final magnified signal of the magnified image.

4. The method according to claim 1, wherein the performing an interpolation-based upsampling operation on an original signal of each frame of image in a target video comprises:
  performing a bilinear-interpolation-based upsampling operation or a bicubic-interpolation-based upsampling operation on the original signal of each frame of image in the target video.

5. The method according to claim 1, wherein:
  the performing forward wavelet transform on the initial magnified signal comprises: performing forward wavelet transform n times on the initial magnified signal; and
  the performing inverse wavelet transform on the second signal and the enhanced first signal comprises: performing inverse wavelet transform n times on the second signal and the enhanced first signal.

6. An apparatus for lifting video resolution, comprising a processor and a non-transitory computer-readable storage medium storing instructions that, when executed by the processor, cause the apparatus to:
  perform an interpolation-based upsampling operation on an original signal of each frame of an image in a target video, to obtain an initial magnified signal of a magnified image corresponding to the image in the target video;
  obtaining a preset magnification N of the target video;
  determining a number n of times of wavelet transform according to the preset magnification N of the target video, wherein N=n/(n−1), and n is an integer not less than 2;
  perform a forward wavelet transform n times on the initial magnified signal to decompose the initial magnified signal into a first signal and a second signal, wherein the first signal and the original signal have the same volume;
  enhance the first signal; and
  perform an inverse wavelet transform n times on the second signal and the enhanced first signal, to obtain a final magnified signal of the magnified image.

7. The apparatus according to claim 6, wherein to perform the forward wavelet transform, the non-transitory computer-readable storage medium store instructions that, when executed by the processor, cause the apparatus to:
  segment the initial magnified signal s[n] into a first segmentation signal $s_e[n/2]$ and a second segmentation signal $s_o[n/2]$ that are associated with each other;
  perform a prediction operation according to a formula $d[n/2]=s_o[n/2]-P(s_e[n/2])$, to obtain the first signal d[n/2], wherein P(•) is a preset prediction operator; and
  perform an update operation according to a formula $c[n/2]=s_e[n/2]+U(d[n/2])$, to obtain the second signal c[n/2], wherein U(•) is a preset update operator.

8. The apparatus according to claim 7, wherein to perform the inverse wavelet transform, the non-transitory computer-readable storage medium store instructions that, when executed by the processor, cause the apparatus to:
  perform an inverse update operation according to the update operator, the second signal, and the enhanced first signal, to obtain the enhanced first segmentation signal;
  perform an inverse prediction operation according to the prediction operator, the enhanced first signal, and the enhanced first segmentation signal, to obtain the enhanced second segmentation signal; and
  merge the enhanced first segmentation signal and the enhanced second segmentation signal, to obtain the final magnified signal of the magnified image.

9. The apparatus according to claim 6, wherein to perform an interpolation-based upsampling operation, the non-transitory computer-readable storage medium store instructions that, when executed by the processor, cause the apparatus to perform one of:
  a bilinear-interpolation-based upsampling operation on the original signal of each frame of image in the target video; and
  a bicubic-interpolation-based upsampling operation on the original signal of each frame of image in the target video.

10. The apparatus according to claim 6,
wherein:
  to perform the forward wavelet transform, the non-transitory computer-readable storage medium store instructions that, when executed by the processor, cause the apparatus to perform forward wavelet transform n times on the initial magnified signal; and
  to perform an inverse wavelet transform, the non-transitory computer-readable storage medium store instructions that, when executed by the processor, cause the apparatus to perform inverse wavelet transform n times on the second signal and the enhanced first signal.

11. A computing device, comprising:
  a network interface, enabling the computing device to obtain a target video;
  a processor connected to the network interface; and
  a non-transitory computer-readable storage medium storing instructions that, when executed by the processor, cause the apparatus to perform a method comprising:
  performing an interpolation-based upsampling operation on an original signal of each frame of an image in a target video, to obtain an initial magnified signal of a magnified image corresponding to the image;
  obtaining a preset magnification N of the target video;
  determining a number n of times of wavelet transform according to the preset magnification N of the target video, wherein N=n/(n−1), and n is an integer not less than 2;
  performing a forward wavelet transform n times on the initial magnified signal to decompose the initial magnified signal into a first signal and a second signal, wherein the first signal and the original signal have the same volume;
  enhancing the first signal; and
  performing inverse wavelet transform n times on the second signal and the enhanced first signal, to obtain a final magnified signal of the magnified image.

12. The computing device according to claim 11, wherein the performing forward wavelet transform on the initial magnified signal to decompose the initial magnified signal into a first signal and a second signal comprises:
  segmenting the initial magnified signal s[n] into a first segmentation signal $S_e[n/2]$ and a second segmentation signal $s_o[n/2]$ that are associated with each other;
  performing a prediction operation according to a formula $d[n/2]=s_o[n/2]-P(s_e[n/2])$ to obtain the first signal d[n/2], wherein P(•) is a preset prediction operator; and
  performing an update operation according to a formula $c[n/2]=s_e[n/2]+U(d[n/2])$ to obtain the second signal c[n/2], wherein U(•) is a preset update operator.

13. The computing device according to claim 12, wherein the performing inverse wavelet transform on the second signal and the enhanced first signal, to obtain a final magnified signal of the magnified image comprises:
- performing an inverse update operation according to the update operator, the second signal, and the enhanced first signal, to obtain the enhanced first segmentation signal;
- performing an inverse prediction operation according to the prediction operator, the enhanced first signal, and the enhanced first segmentation signal, to obtain the enhanced second segmentation signal; and
- merging the enhanced first segmentation signal and the enhanced second segmentation signal, to obtain the final magnified signal of the magnified image.

14. The computing device according to claim 11, wherein the performing an interpolation-based upsampling operation on an original signal of each frame of image in a target video comprises:
- performing a bilinear-interpolation-based upsampling operation or a bicubic-interpolation-based upsampling operation on the original signal of each frame of image in the target video.

15. The computing device according to claim 11 wherein:
- the performing forward wavelet transform on the initial magnified signal comprises: performing forward wavelet transform n times on the initial magnified signal; and
- the performing inverse wavelet transform on the second signal and the enhanced first signal comprises: performing inverse wavelet transform n times on the second signal and the enhanced first signal.

* * * * *